INVENTORS.
TROY D. GRAYBEAL
CHARLES PHILIP CARDEIRO
BY
ATTORNEYS.

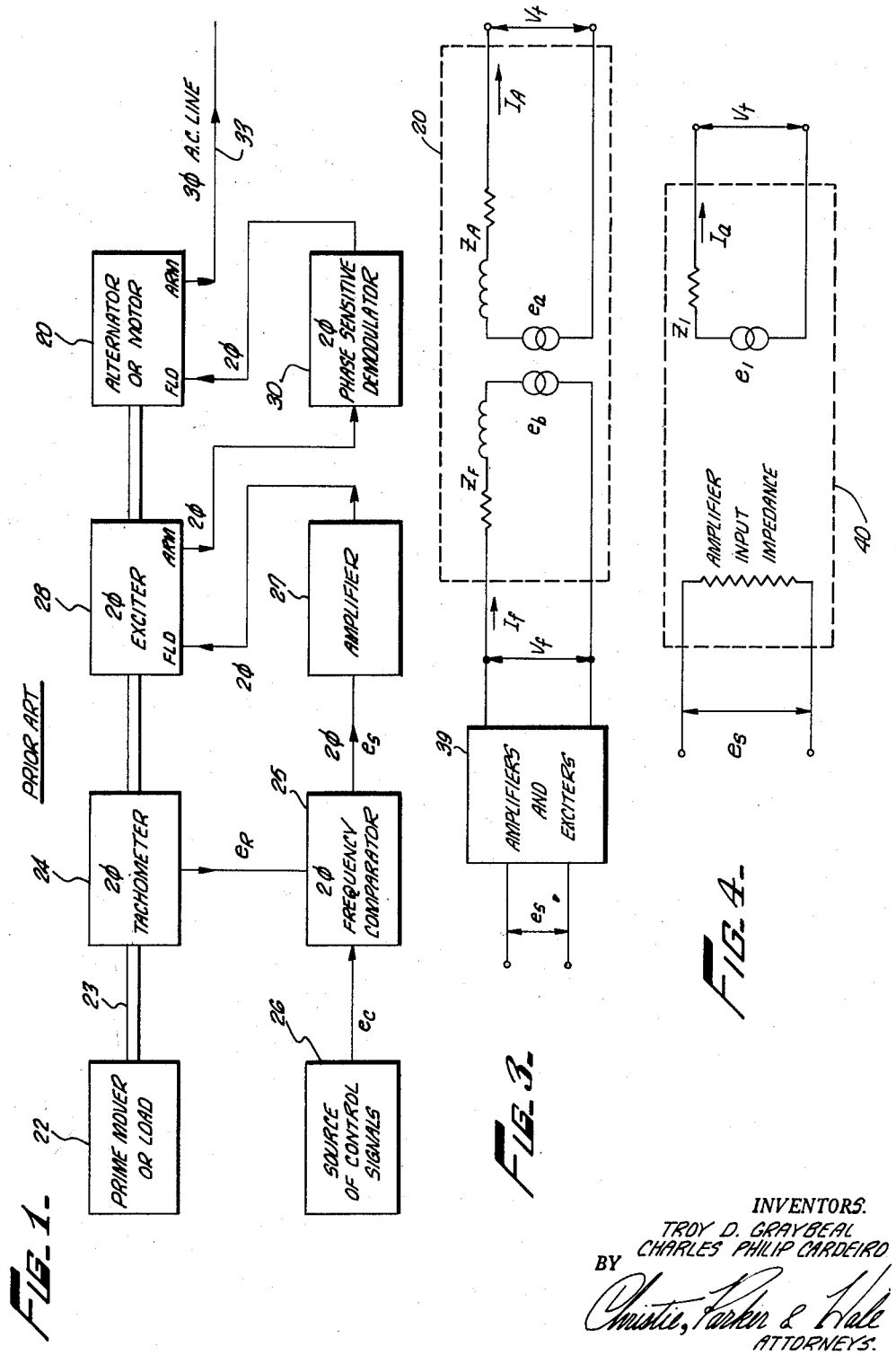

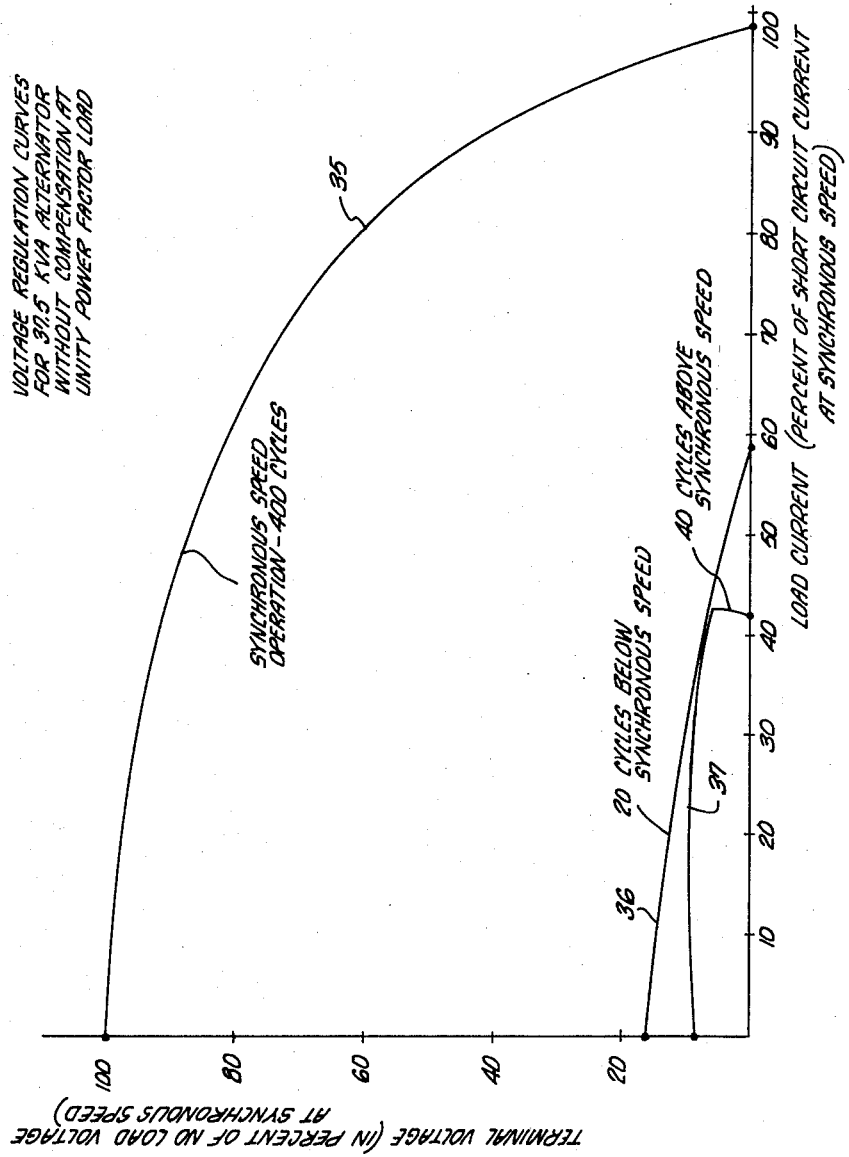

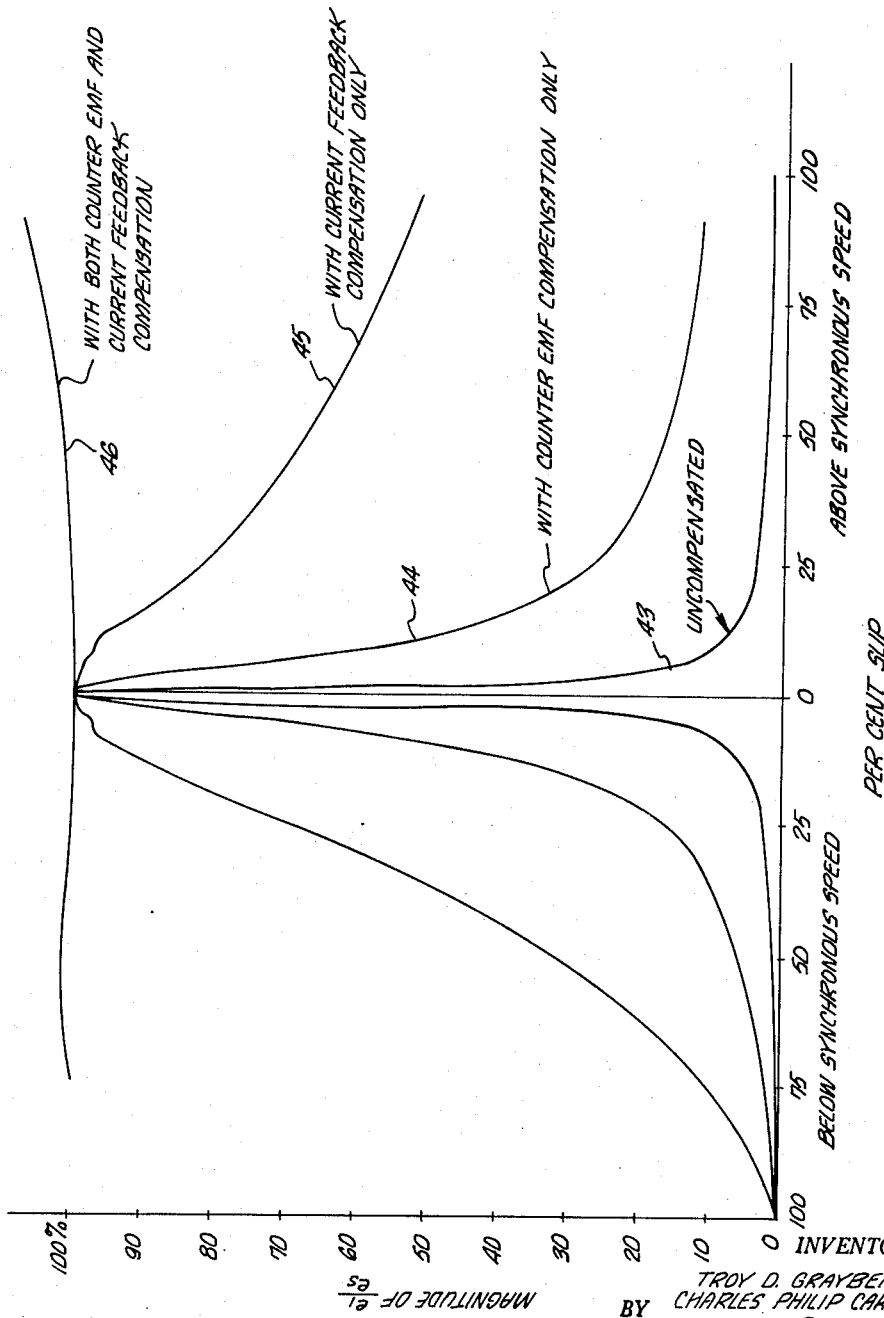

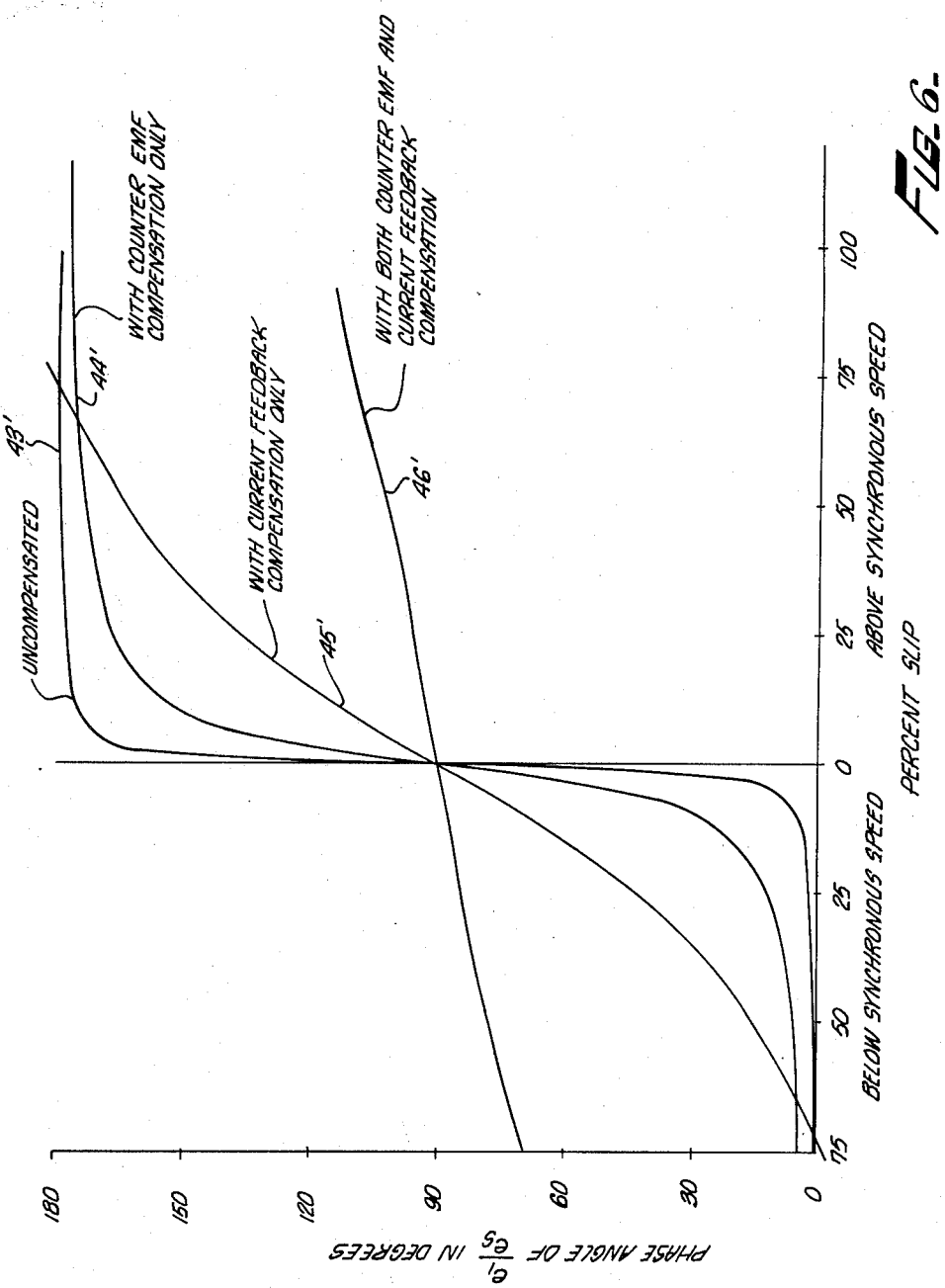

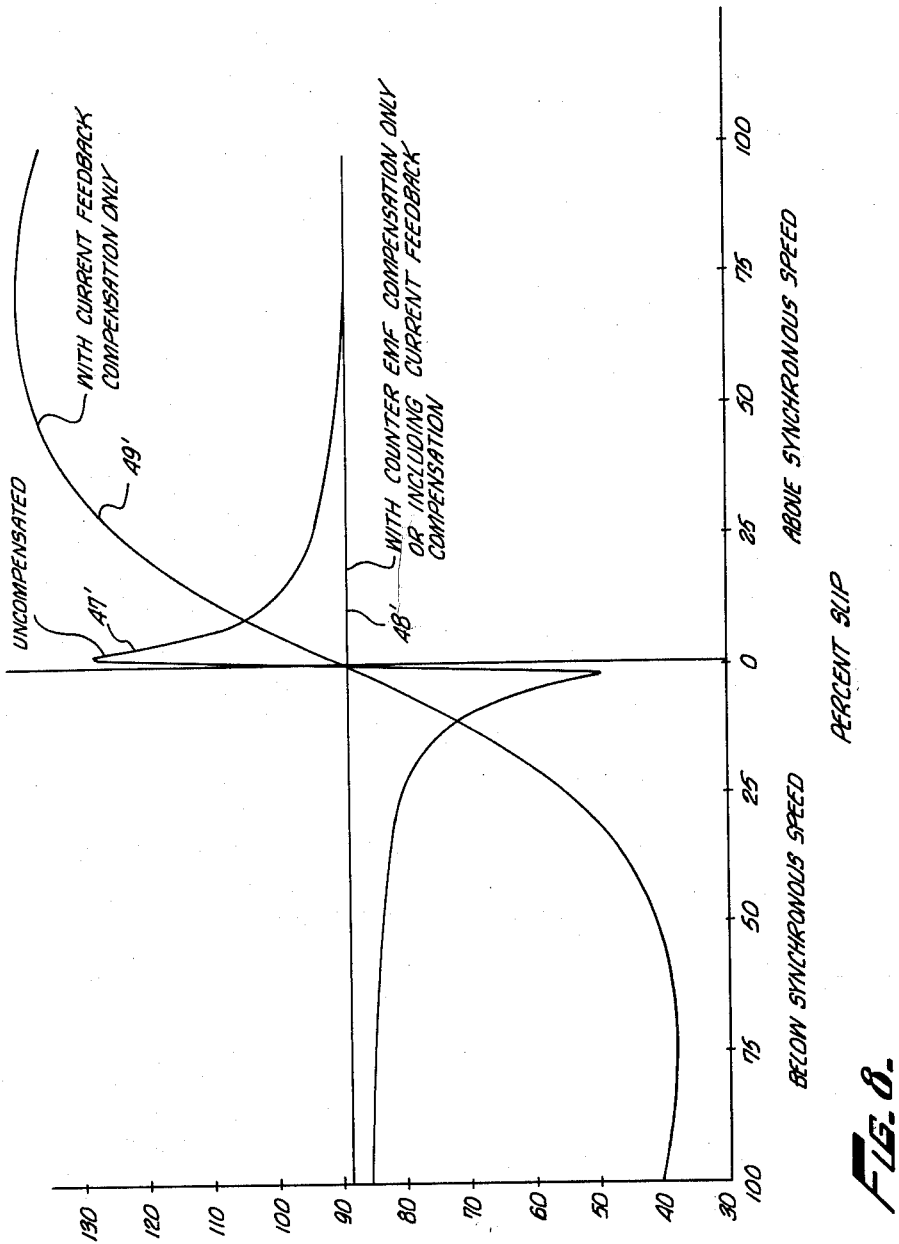

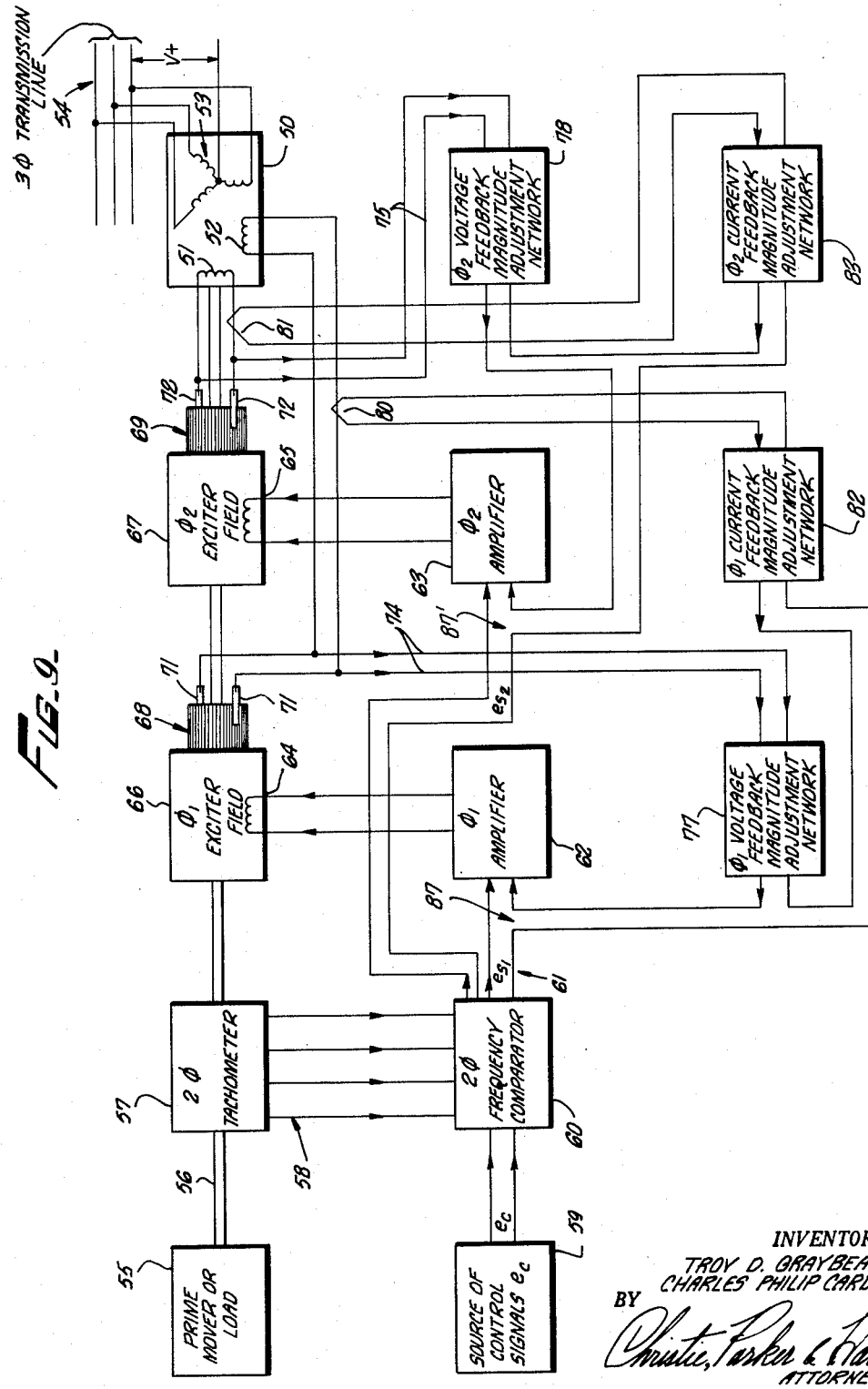

INVENTORS.
TROY D. GRAYBEAL
CHARLES PHILIP CARDEIRO
BY
Christie, Parker & Hale
ATTORNEYS.

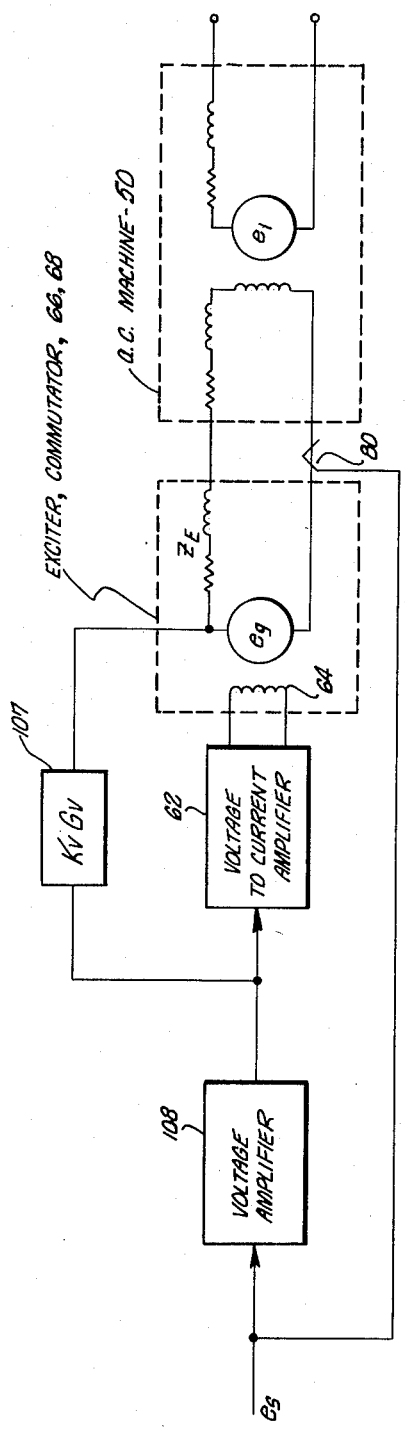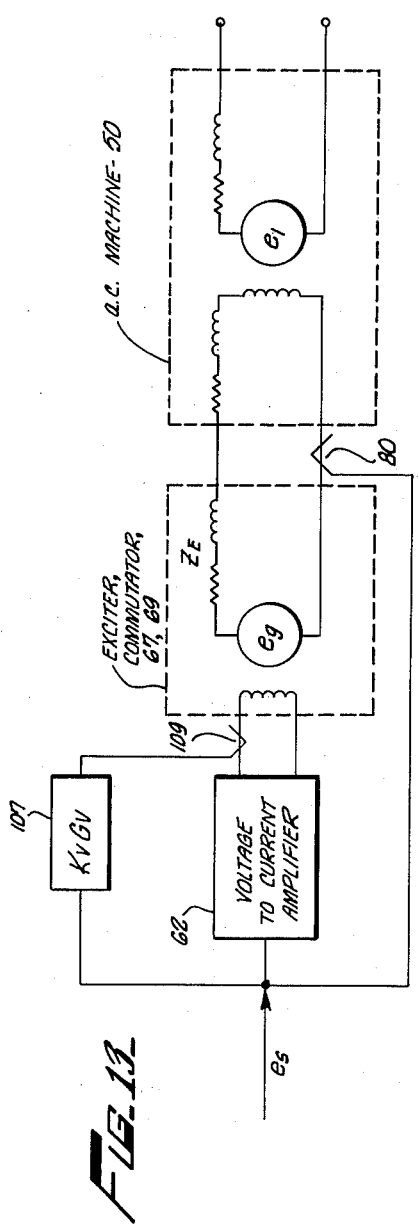

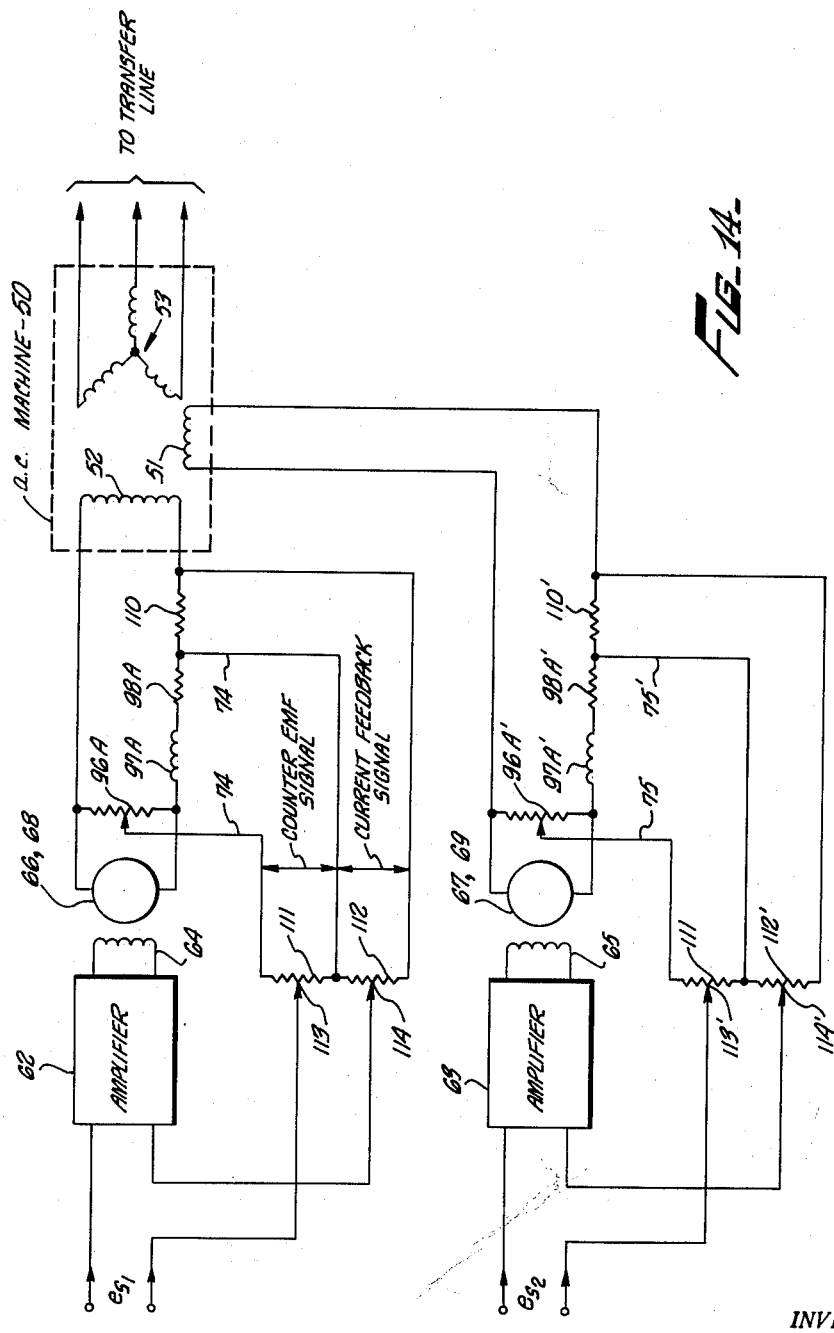

FIG. 16.

United States Patent Office 3,122,696
Patented Feb. 25, 1964

3,122,696
CONTROL APPARATUS FOR ALTERNATING CURRENT DYNAMOELECTRIC MACHINES
Troy D. Graybeal and Charles Philip Cardeiro, Anaheim, Calif., assignors to The Siegler Corporation, Anaheim, Calif., a corporation of Delaware
Filed Jan. 9, 1961, Ser. No. 81,389
30 Claims. (Cl. 322—20)

The present invention relates generally to apparatus for controlling alternating current (A.C.) dynamoelectric machines and more particularly to an apparatus for controlling the excitation of such machines.

Control systems for A.C. dynamoelectric machines are known in which the shaft speed (in motor applications) or the frequency of an alternating current output (in generator applications) is controlled by applying A.C. excitation to the field windings to control the direction and speed of rotation of the magnetic field for the armature. In such systems the rotating magnetic flux for the armature is made up of two components: (1) the direction and speed of the mechanical rotation of the field windings relative to the armature and (2) the phase and frequency of the A.C. voltage applied to the field windings. The A.C. machines utilized in such systems are generally constructed with a non-salient pole field and armature structure. For example, such a machine may be constructed similar to an induction motor with the rotor windings being connected to conventional slip rings for external excitation. See U.S. Patent No. 2,854,617 which was granted to L. J. Johnson on September 30, 1958.

Controlled flux A.C. excited induction machines are very useful in producing controlled frequency alternating current regardless of shaft speed variations (in generator applications) and also for providing accurate control of the speed, torque or horse power output of an A.C. motor. Whether an A.C. machine operates as a generator or as a motor is determined by the phase angle between the armature current and the field current or rotating magnetic flux.

An ordinary synchronous (or induction) machine will operate as a generator and deliver power into an electrical system if sufficient torque is applied to the rotor to force it ahead of its normal no-load position. Such a machine will operate as a motor if sufficient load or load torque is applied to force the rotor to lag behind its normal no-load position. The output power of a synchronous machine (whether operated as a motor or generator) can be controlled by controlling the angular position of the rotor with respect to the phase of the terminal voltage of the machine. In conventional synchronous machines this is accomplished by changing the torque supplied to or delivered by the shaft.

The control of the power factor at which an ordinary synchronous machine operates is normally accomplished by adjusting the magnitude of the voltage applied to the field windings which in turn adjusts the magnitude of the revolving magnetic field. If the machine is operating alone as a generator this adjustment affects the terminal voltage produced by the machine rather than the power factor.

Prior art systems for controlling A.C. excited machines have either ignored the control of real and reactive power or have attempted to control the real power by controlling the phase of the field voltage with respect to the armature voltage and the reactive power by controlling the magnitude of the field voltage. See for example the following articles: (1) "Synchronous-Flux Generator," by O. J. M. Smith, in Electrical Engineering, volume 77, pages 605–610, July 1958; (2) "A Novel Type of Smoothly Variable Speed A.-C. Motor Having Widely Adjustable Power-Factor Characteristics," by Paul K. Charlu, in the Transactions of the American Institute of Electrical Engineers, volume 79, part 1, pages 407–419, 1959; (3) "Constant-Frequency Variable-Speed Frequency-Make-Up Generators," by Bert W. Hoard, in the Transactions of the American Institute of Electrical Engineers, volume 78, part 2, pages 297–301, and 1959; and, (4) U.S. Patent No. 1,903,680 which issued to P. Letrilliart in 1933. Such techniques have long been accepted in power systems theory and are applicable to A.C. machines at synchronous speed. However, at speeds other than synchronous speed, the vector power reflected from the armature to the field of an A.C. machine causes the phase of the field voltage to change relative to the armature voltage as a function of speed and load. Thus as the speed deviates from synchronous speed, the power curve of such a machine shifts in position with respect to the zero angle reference and changes in amplitude. For certain values of speed or excitation frequency the control functions may become interchanged in that the phase angle of the field and armature voltage controls primarily the reactive power output (or power factor) and the magnitude of the field voltage controls primarily the real power output. For certain speeds, the control functions may even become inverted in the sense that an increase in the phase angle causes a decrease in the real power output rather than an increase as would normally be expected.

It is the phase angle of the field current with respect to the armature terminal voltage (shifted by 90°) in an A.C. excited machine that corresponds to the torque angle of an ordinary synchronous machine. It is this phase relationship between the field current and the armature terminal voltage as well as the magnitude of the field current, the magnitude of the armature terminal voltage, the magnitude of the mutual impedance between the field and armature windings and the magnitude and angle of the output impedance of the A.C. excited machine that governs the real and reactive power output. All of these quantities except the mutual impedance between the field and armature windings are functions of the speed or the load or both.

The most important factor which interferes with the satisfactory control of the real and reactive power output of an A.C. excited machine is the output impedance of the machine which changes in phase angle with changes in speed. This effect is caused by the generation of voltage in the field windings of the machine by the rotating magnetic field. Thus, in order to obtain satisfactory control characteristics of an A.C. excited machine it is necessary to compensate for the voltage induced in the field windings by the rotating magnetic field and to provide a free path for the vector power flow associated with this induced voltage. The compensation to be effective must balance the voltages induced in the field windings by the rotating magnetic field such that the magnitude and the phase of the field current may be exactly controlled in response to an input control voltage over a wide range of speeds. Such compensation is provided by the apparatus of the present invention.

In accordance with the present invention means are provided for applying alternating currents to each phase of the polyphase field windings of an A.C. machine to produce a rotating magnetic field. Means are coupled to the field windings of the machine for obtaining a voltage feedback signal associated with each phase of the field windings which includes a measure of the voltage induced across the respective phase of the field windings by the rotating magnetic field. Means are further provided for applying a voltage to each phase of the field windings which is proportional to and substantially in phase with the respective voltage feedback signal to compensate for the voltage induced in the field windings by the rotating magnetic field.

The invention is described in more detail in reference to the accompanying drawings in which:

FIG. 1 is a block diagram of a conventional prior art apparatus for controlling the field of an A.C. machine;

FIG. 2 is a graph illustrating voltage regulation curves for the apparatus of FIG. 1;

FIG. 3 is a schematic circuit diagram illustrating an equivalent circuit for one phase of the A.C. machine of FIG. 1;

FIG. 4 is a schematic circuit diagram of the Thevenin equivalent circuit for the system of FIG. 1 between the amplifier input and the generator or motor output;

FIG. 5 is a graph illustrating the changes in the magnitude of the excitation transfer function in the circuit of FIG. 4 with changes in the excitation frequency;

FIG. 6 is a graph illustrating changes of the phase angle of the excitation transfer function in the circuit of FIG. 4 with changes in excitation frequency;

FIG. 8 is a graph illustrating changes in the output impedance angle of the circuit of FIG. 4 with changes in excitation frequency;

FIG. 9 is a block diagram of an apparatus in accordance with the present invention;

FIG. 12 is a block diagram of another embodiment of the present invention;

FIG. 13 is a block diagram partially in schematic form of an apparatus in accordance with the present invention;

FIG. 14 is a modification of the apparatus of FIG. 11;

FIG. 15 is a block diagram of another embodiment of the present invention; and

Figure 7:
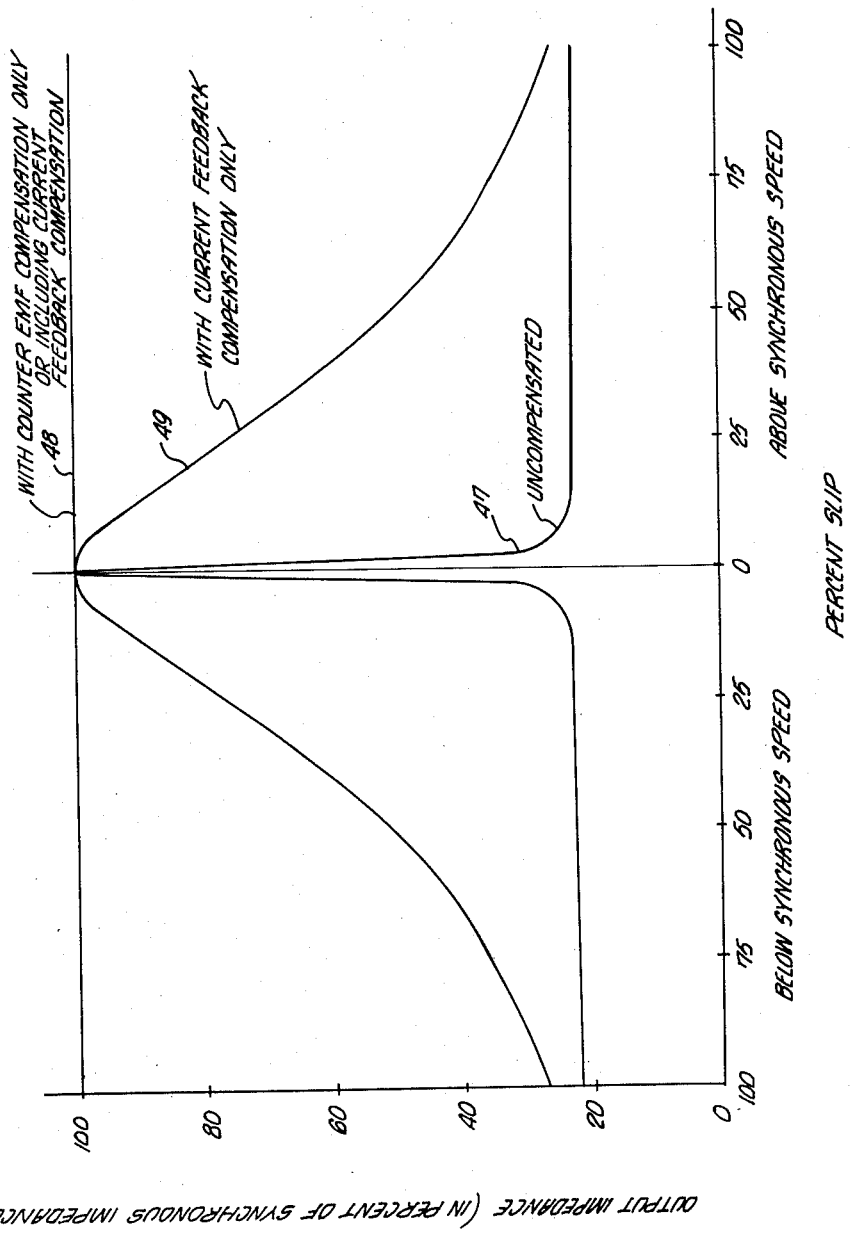
FIG. 7 is a graph illustrating changes in the magnitude of the output impedance of the circuit of FIG. 4 with changes in excitation frequency.

Referring now to the drawings wherein like parts are designated by the same reference numerals throughout the several figures and more particularly to FIG. 1 there is illustrated a conventional type of apparatus for controlling the A.C. field applied to a dynamoelectric machine 20. The machine 20 may be constructed similar to an induction motor with the field windings wound on the rotor and connected to conventional slip rings (not shown) for external excitation as will be more fully explained. The armature windings (not shown) of the machine 20 may be wound on the stator in a conventional manner. The machine 20 is connected to a prime mover or load 22 through a shaft 23. If the machine 20 is operating as a generator a prime mover is utilized to drive the rotor. If the machine 20 is controlled to operate as a motor a load is connected to the shaft 23. A two phase tachometer 24 is also coupled to the shaft 23 for providing a speed reference signal $e_R$ which is representative of the speed of rotation of the machine 20. A two phase frequency comparator or phase-sensitive demodulator 25 is coupled between the tachometer 24 and a source of control signals 26 for providing a polyphase output regulating signal $e_S$ which has a frequency equal to the difference in the frequencies of the speed reference and control signals. The regulating signal $e_S$ is amplified by an amplifier 27 and a two phase exciter 28 and then demodulated by a two phase demodulator 30 and applied to the field windings of the A.C. machine 20 as shown. The demodulator 30 may be of any conventional type such as illustrated in the Johnson patent or the Smith article referred to above, and serves to demodulate the output from the exciter 28 in a well known manner.

The frequency of the output signal from the demodulator 30 is identical to the frequency of the regulating signal $e_S$. This frequency is the same as the slip frequency of the machine 20 and corresponds to the slip speed or the difference between the actual speed of the shaft 23 and the synchronous speed as determined by the frequency of the armature current or voltage in the machine 20. The slip frequency current applied to the field windings of the machine 20 produces a rotating magnetic field which adds to or subtracts from the mechanical rotation of the rotor or shaft 23 to produce a rotating flux in synchronism with the frequency of the armature current and voltage in the machine 20 as is well known. See for instance U.S. Patent No. 767,773, which issued to W. Stanley on August 16, 1904. At synchronous speed the excitation current to the machine 20 has a frequency of zero or is direct current. The armature windings of the machine 20 are connected to a suitable transmission line 33.

To more clearly understand the operation of the apparatus of FIG. 1 assume that it is desired to control the machine 20 as a generator for producing a constant frequency output voltage. In this type of operation the source of control signals 26 preferably produces a signal $e_C$ having the desired output frequency. The tachometer 24 generates a two phase signal representative of the speed of the rotor of the machine 20 which is subtracted from or added to the control signals $e_C$ by the comparator 25 to provide a two phase slip frequency regulating signal $e_S$. The regulating signal $e_S$ is amplified and applied to the field of the machine 20 to provide a rotating magnetic field relative to the field windings which adds to (or subtracts from) the field produced by the rotating shaft to produce a resulting rotating magnetic flux which induces a voltage in the armature windings of the desired output frequency. Thus the speed of rotation of the magnetic flux produced by the field windings of the machine 20 is constant regardless of shaft speed and generates alternating current of fixed frequency in the armature windings. Such a prior art system will maintain the desired output frequency (or speed if operating as a motor) with relatively large variations in the shaft speed or excitation frequency but will not produce the desired output power and will not operate at the desired power factor except at synchronous speed.

Two characteristic of an A.C. machine operating with an excitation voltage of constant magnitude cause the power output and power factor to change when the shaft speed departs from synchronous speed. One characteristic is concerned with the change in the impedance of the field windings with variations in the slip speed or excitation frequency. This change is governed by the effective time constants of the field windings. The other characteristic is concerned with the voltage and power that is generated in the field windings of the A.C. machine by the rotating magnetic field.

The impedance of the field windings of an A.C. machine change as a result of the reactance of the field windings which increases as the slip speed or excitation frequency increases. This reactance of the field windings presents a much higher impedance to the field current than the D.C. resistance of the field windings for even small values of slip speed. This causes the field magnetizing current to decrease as the slip speed increases for any given excitation voltage, which in turn results in decreasing the voltage generated in the armature windings of the machine.

The voltage (counter E.M.F.) and power generated in the field windings of an A.C. machine due to the rotating magnetic field (produced by the A.C. excitation) oppose the applied excitation voltage and change the magnitude and phase of magnetizing or excitation current. The magnitude and phase angle of the power generated in the field windings by the rotating magnetic field varies with the slip speed and load for operation of an A.C. machine above and below synchronous speed.

To control the output power of an A.C. machine operating as a generator (below synchronous speed) electrical power must be supplied to the field windings to combine with the mechanical power supplied to the rotor by the prime mover to supply the necessary armature power for the electrical load. As the speed is increased, the electrical power transmitted by the field windings to the armature windings decreases and becomes zero at synchronous speed at which time the excitation current is D.C. As the speed increases above synchronous speed electrical power must be removed from the field windings. Thus the electrical rotor (or field winding) power reverses as the machine passes through synchronous speed. Where exciters are employed to supply the excitation the electrical energy removed from the field windings of the A.C. machine above synchronous speed is recovered as mechanical energy in the exciters to help drive the A.C. machine. When the A.C. machine is operated as a motor the direction of the electrical energy in the field windings is opposite to that just described for generator operation. See for example an article entitled "Energy Conversion Properties of Induction Machines in Variable Speed Constant Frequency Generating Systems," by M. Riaz, American Institute of Electrical Engineering Transactions, volume 78, part 2 (Applications in Industry), March 1959, pages 25–30.

Since both the generated rotor vector power (real and reactive) and the excitation volt-amperes flow in the field windings of the A.C. machine, provision must be made for independent control of these two vector power components. The generated rotor vector power must be provided with a free channel of flow on demand by the load at any operating speed to prevent interference with the excitation volt-amperes supplied to maintain or regulate the voltage generated in the armature windings.

Unless these two characteristics of the A.C. excited machine (counter E.M.F. and field winding reactance) are compensated for, control of the output power and power factor cannot be accomplished by the control signal independently of shaft speed and load.

Consider for example the graph of FIG. 2, wherein the ordinate represents the terminal voltage of a 400 cycle, 37.5 k.v.a. machine operated as a generator in the system shown in FIG. 1 and the abscissa represents the load current with unity power factor load. This curve is a conventional voltage regulation curve which illustrates the effect of the field circuit time constant and generated rotor power on the voltage and power output of the machine. At synchronous speed the field windings are supplied with direct current and consequently the counter E.M.F. (or generated rotor power) and the field winding reactance are zero. Curve 35 illustrates the operation of the machine at synchronous speed and is similar to the voltage regulation curve of an ordinary synchronous machine. Keeping the magnitude and phase of the control signal $e_c$ constant the voltage regulation curves of the machine were obtained at 20 cycles below synchronous speed as shown by curve 36 and at 40 cycles above synchronous speed as shown by curve 37. As illustrated by curve 36, the no load output voltage with a 5% slip frequency decreased to approximately 16% of its synchronous speed value. At 40 cycles above synchronous speed (curve 37), the no load output voltage dropped to less than 10% of the synchronous speed value.

To illustrate the reasons for the voltage and power output changes of an A.C. machine operated in the system of FIG. 1 reference is now made to FIGS. 3–8. In FIGS. 3 and 4 there are illustrated equivalent circuits of one phase of the machine 20 of FIG. 1. In FIG. 3 $Z_A$ and $Z_F$ represent the armature and field leakage impedances, respectively. In FIG. 4, $Z_1$ represents the output impedance of one phase 40 of the machine 20. The voltage sources $e_a$ and $e_b$ of FIG. 3 represent the voltages actually generated in one phase of the armature and field windings respectively, and $e_1$ of FIG. 4 represents the voltage generated behind the output impedance of the machine 20. This voltage $e_1$ corresponds with the voltage generated behind the synchronous impedance in a synchronous machine and is identically the same when the machine 20 is operating at synchronous speed. The amplifier and exciter arrangement for supplying the field current for one phase of the field windings is represented at 39 in FIG. 3 and is included in the Thevenin equivalent circuit of FIG. 4 in the excitation transfer function $e_1/e_s$. The regulating signal $e_s$ is illustrated as the input to the amplifier and exciter unit 39 and the line-to-neutral output voltage from the machine 20 is designated as $V_t$. The excitation transfer function $e_1/e_s$ defines the relationship in terms of magnitude, phase and frequency between the voltage $e_1$ generated behind the output impedance of the machine 20 and the input voltage $e_s$ to the amplifier-exciter unit 39. This transfer function may be obtained by operating the machine 20 as a generator at no load (in which case $I_A=0$ and $e_1=V_t$) with a constant regulating voltage $e_s$ of proper frequency applied to the input of the amplifier 27 and measuring the output voltage $V_t$ in terms of magnitude and phase for different slip frequencies and speeds which give the same output frequency.

Referring now to FIGS. 5–8, the abscissa represents the slip speed as a percent of synchronous speed and the ordinate represents the magnitude or phase angle of the output to input voltage ratio or excitation transfer function and the output impedance for the circuit of FIG. 4 as shown on the graphs. In FIGS. 5 and 6, curves 43 and 43′ represent the changes in the voltage gain or ratio of $e_1$ to $e_s$ and the phase angle of this ratio, respectively, with variations in slip speed for the A.C. excited machine 20 of FIG. 1 wherein no compensation is provided for the generated rotor power or field winding reactance. As is illustrated by the curve 43 the no load or output voltage decreases rapidly with very small changes in the slip speed both below and above synchronous speed. Curves 44, 45, 46, 44′, 45′ and 46′ of FIGS. 5 and 6 illustrate the changes in voltage gain or phase angle of the output voltage to the input regulating signal $e_s$ when certain compensation is added to the circuit of FIG. 1 to correct for the generated rotor power and field winding reactance as will be described later.

In FIGS. 7 and 8, curves 47 and 47′ represent the changes in the magnitude of the output impedance and changes in the output impedance angle of the armature windings of the machine 20 of FIGS. 1 and 4 with variations in slip speed when no compensation is provided. Curve 47 shows that the magnitude of the output impedance of the armature circuit decreases for speeds below and above synchronous speed. This characteristic would be desirable except for the fact that it is accompanied by a large change in the phase angle of the output impedance as shown by the curve 47′ of FIG. 8. As the speed of the machine 20 increases from synchronous speed to a few cycles above synchronous speed, the phase angle of the output impedance increases very rapidly. This causes the output impedance to effectively become a negative impedance and results in self-excitation of the machine 20. This characteristic accounts for the rising voltage curve 37 in FIG. 2. At a few percent above synchronous speed the machine may become completely unstable for leading power factor loads. At a few cycles below synchronous speed the output impedance angle decreases rapidly and produces an unsatisfactory voltage regulation characteristic. Curves 48, 49, 48′ and 49′ of FIGS. 7 and 8 represent changes of the output impedance when certain compensation is applied to the system of FIG. 1 as will be more fully described.

Where it is desired to control the power output and power factor of an A.C. excited machine by means of the electrical control signal $e_c$, it is necessary to maintain the characteristics illustrated in FIGS. 5–8 relatively constant. This can be accomplished by providing means for compensating for the voltage generated in the field windings by the rotating magnetic field (counter E.M.F.) and means for compensating for changes in the field winding leakage reactance with changes in slip speed.

This compensation is achieved by the apparatus of the present invention as shown in FIG. 9 in which an A.C. machine 50 is provided with a pair of field windings 51 and 52 for producing a two phase magnetic field for a three phase armature winding 53. The armature winding 53 is connected to a three phase transmission line indicated generally at 54 for supplying power to the line or receiving power from the line depending upon whether the machine 50 is operating as a generator or a motor. The machine 50 is coupled to a prime mover or load 55 by means of a shaft 56. Speed sensitive or speed measuring means such as a two phase tachometer 57 is coupled to the shaft 56 for providing a two phase speed reference signal across an output circuit 58 which is representative of the speed of the shaft 56 and the machine 50.

A source of control signals 59 is provided for producing control signals $e_c$ of preselected frequency, amplitude and phase for controlling the excitation of the machine 50. A two phase frequency comparator 60 has a first input connected to the source of control signals 59 and a second input connected to the tachometer output circuit 58 for providing two 90° phase displaced regulating signals ($e_{s1}$ and $e_{s2}$) across an output circuit 61. The regulating signals $e_{s1}$ and $e_{s2}$ have a frequency which is the difference between the frequencies of the output signals from the tachometer 57 and the source of control signals 59. The magnitude and phase of the regulating signals $e_{s1}$ and $e_{s2}$ are controlled by the amplitude and phase of either the control signals $e_C$, the output signals from the tachometer 57, or both. A pair of voltage-to-current power amplifiers 62 and 63 are connected between the output of the frequency comparator 60 and the field windings 64 and 65 of two single phase exciters 66 and 67, respectively. The exciters 66 and 67 are illustrated as being connected to the shaft 56 to be driven by the prime mover 55 or by the machine 50 depending upon its operation. If desired the exciters 66 and 67 can be driven by a separate prime mover. The armature windings of the exciters 66 and 67 (not shown) are coupled to a pair of commutators 68 and 69 respectively. The commutator bars of the commutators 68 and 69 are coupled to the shaft 56 to rotate therewith. The commutators 68 and 69 include stationary brushes 71 and 72 which are connected to the field windings 52 and 51, respectively, of the machine 50.

The signals applied to the field windings of the exciters 66 and 67 have a frequency equal to the frequency of the regulating signals $e_{s1}$ and $e_{s2}$. The commutators 68 and 69 convert the voltages generated in the exciter armatures to the same frequency as that supplied to the field windings 64 and 65. These voltages are then supplied to the field windings 51 and 52 of the machine 50 and have a frequency and phase equal to that of the regulating signals $e_{s1}$ and $e_{s2}$. The combination including the exciters 66 and 67 and commutators 68 and 69 represent one embodiment of the elements 28 and 30 of FIGURE 1 and functions as a polyphase amplifier capable of handling power flow in either direction. The excitation signals applied to the field windings 51 and 52 are phase displaced by 90° due to the polyphase signals $e_{s1}$ and $e_{s2}$ and produce a rotating magnetic field whose rotation adds to or subtracts from the mechanical rotation of the shaft 56. The resultant magnetic field induces an A.C. voltage in the armature winding 53.

To compensate for the voltages induced in the field windings of the machine 50 by the rotating magnetic field when the machine is running above or below synchronous speed, positive voltage feedback is provided. A pair of voltage sensing lines 74 and 75 are connected across the field windings 52 and 51, respectively, to obtain voltage feedback signals which include a measure of the counter E.M.F. or voltage induced in the respective field windings by the rotating magnetic field. The voltage sensing line 74 is coupled through a voltage feedback magnitude adjustment network 77 to the input of amplifier 62 (in series with the regulating signal $e_{s1}$) to provide positive or in-phase voltage feedback which cancels out or compensates for the counter E.M.F. induced in the field winding 52. The network 77 controls the magnitude of the voltage feedback signal and may be a suitable impedance network which provides a feedback signal of the proper value and phase to substantially cancel out the voltage induced in the field winding 52 by the rotating magnetic field. The network 77 may include a tachometer, a phase inverter, a frequency sensitive network or other devices if necessary to provide the desired positive voltage feedback. The voltage sensing line 75 is connected through a network 78 (similar to the network 77) to the input of amplifier 63 to provide positive or regenerative voltage feedback for cancelling out the effects of the counter E.M.F. generated in the field winding 51. To provide complete compensation for the counter E.M.F. generated in the field windings of the machine 50 the voltage feedback loop for each phase should have a gain of approximately unity. Accordingly the networks 77 and 78 should preferably have an attenuation characteristic (or transfer function) which is the reciprocal of the forward gains (or transfer function) of the amplifiers and exciters connected in the respective field windings of the machine 50.

To modify the effective time constant or improve the response time of the field windings 51 and 52 and thus compensate for changes in the reactance of these windings with changes in the slip or excitation frequency, degenerative or negative current feedback is preferably utilized. For this purpose a pair of current sensing elements 80 and 81 (i.e., shunts) are coupled to the field windings 52 and 51, respectively, to obtain a measure of the current flowing through the respective field windings. The current sensing elements 80 and 81 are coupled through current feedback magnitude adjustment networks 82 and 83, respectively, to the inputs of the amplifiers 62 and 63 (in series with the respective regulating signals $e_{s1}$, $e_{s2}$ and the voltage feedback signals) as shown. The amount of current feedback required depends upon the design constants of the machine 50 and the anticipated range of slip frequencies over which the machine is to be operated. The current feedback circuits also provide stabilization for the change in the gain of the exciters 66 and 67 with changes in speed of the shaft 56. If desired, suitable frequency sensitive networks may be included in the current or voltage feedback circuits to improve the overall operation of the system. For certain applications negative current feedback compensation alone may be employed to provide adequate control of the magnitude and time phase relationship of the field excitation current of the A.C. machine 50. Where current feedback alone is utilized in a control system employing an exciter to supply the field excitation for an A.C. machine amplifying means such as the voltage-to-current amplifier 62 and 63 must be connected between the field windings of the exciter and the feedback summing junctions 87 and 87' to provide an output current which is substantially proportional and in phase with the input voltage to the amplifying means. This type of amplifying means is necessary where current feedback compensation alone is utilized to compensate for the reactance of the exciter field winding to improve or extend the frequency response characteristics of the exciter.

Referring now to FIGS. 5-8 there is illustrated the effect of current and voltage feedback on the operation of a 400 cycle, 37.5 k.v.a. machine when operated as a generator. The curve 44 of FIG. 5 illustrates the effect of counter E.M.F. compensation or voltage feedback only on the voltage gain of the system. In the apparatus of FIG. 9 the voltage $e_1$ may be taken as the line to neutral generated voltage of the machine 50 as shown in FIG. 4 and the regulating signal $e_s$ may be considered as $e_{s1}$ or $e_{s2}$. As shown by the curve 44 the voltage gain characteristic is considerably improved with counter E.M.F. compensation only. However, counter E.M.F. compensation alone does not provide adequate voltage compensation for large changes in the speed of the machine 50. The curve 45 of FIG. 5 illustrates the effect on the voltage gain characteristic with negative current feedback compensation only. The curve 46 of FIG. 5 illustrates the effect on the voltage gain characteristic with both counter E.M.F. and current feedback compensation. As will be noted by the curve 46 the no load voltage gain is relatively constant over a wide speed range with both types of compensation. The voltage gain of the system decreases as the shaft speed approaches zero with either type of compensation due to the decrease in gain of the exciters 66 and 67 unless the exciters are mounted on a separate shaft and driven at constant speed.

The curves 44', 45' and 46' of FIG. 6 illustrate the effect on changes in the phase angle of the ratio of the generated voltage $e_1$ to the regulating signal $e_s$ with changes in slip speed where counter E.M.F. compensation alone is employed (curve 44'), where current feedback alone is used (curve 45'), and where both types of compensation are utilized (curve 46'). As is shown by curves 46 and 46', counter E.M.F. and current feedback compensation together provide excellent control of the voltage gain characteristics of the system with large changes in slip speed.

In FIG. 7 the curve 48 illustrates the effect on the magnitude of the output impedance with counter E.M.F. compensation alone or with counter E.M.F. and current feedback compensation and the curve 49 illustrates the effect on the magnitude of the output impedance with current feedback compensation only. As is illustrated by the curve 48 the magnitude of the output impedance remains constant with counter E.M.F. compensation only or with both types of compensation.

In FIG. 8 the curve 48' represents the output impedance angle with various slip speeds where counter E.M.F. compensation alone (or counter E.M.F. and current feedback compensation) is employed. This curve clearly illustrates that the output impedance angle is constant where counter E.M.F. compensation is utilized. The curve 49' illustrates the effect on the output impedance angle with current feedback compensation only where the loop gain of the current feedback circuit is approximately 30. This curve 49' clearly illustrates that while negative current feedback alone reduces the change of the output impedance angle with variations in slip speed, such current feedback does not provide complete compensation since the output impedance angle changes over many degrees with small changes in slip speed. This change in the angle of the output impedance is very important where accurate control of the machine 50 is desired since even small changes in the output impedance angle will alter the power output of the machine.

In regard to the apparatus of FIG. 9, it should be noted that it is not necessary to employ commutators between the armatures of the exciters 66 and 67 and the field windings of the machine 50. Many other types of demodulators which are well known in the art may be utilized to demodulate the armature currents in the exciters 66 and 67 and apply the desired slip frequency excitation signals to the field windings of the machine 50. It is also not essential that exciters be employed in the apparatus in FIG. 9 as other types of amplifiers may be utilized to provide the necessary amplification. It is of course necessary to provide some means for receiving power from the field windings of the A.C. machine 50 when it is operating above synchronous speed (as a generator) or below synchronous speed (as a motor). The exciters perform this function in a very efficient manner since the power received from the field windings of the machine 50 is converted in the exciters to mechanical energy which is utilized to help drive the machine 50 or the load 55. The tachometer 47 may also be designed to generate a single phase output signal if a suitable phase shifting network is connected to one of the inputs of the frequency comparator 60 to provide a polyphase regulating signal which may be amplified and applied to the field windings of the machine 50.

Figure 10:
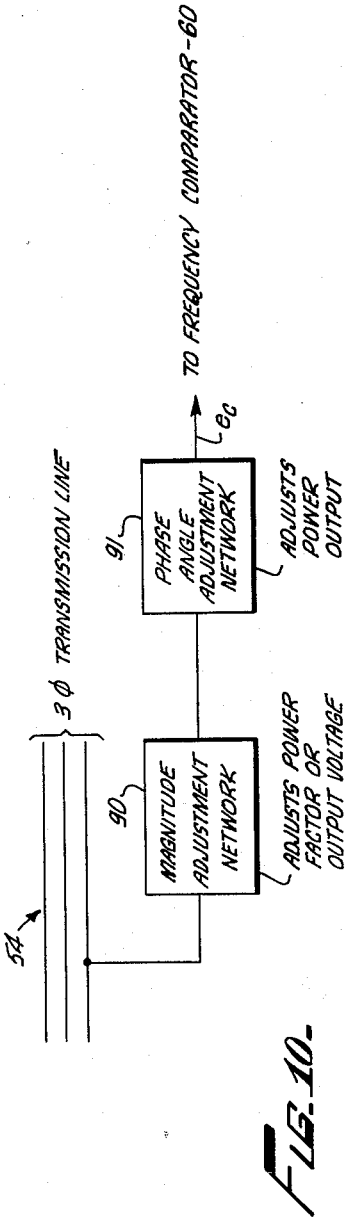
FIG. 10 is a block diagram of one type of source of control signals which may be utilized in the apparatus of FIG. 9.

Referring now to FIG. 10 there is illustrated one type of source of control signals for the apparatus of FIG. 9. Such a source may include a magnitude adjustment network 90 and a phase angle adjustment network 91 connected in series between the transmission line 54 and one input to the frequency comparator 60. The magnitude adjustment network 90 may be a suitable variable impedance device which controls the magnitude of the signal from the three phase line 54. The phase angle adjustment network 91 may be a conventional phase shifting network for controlling the phase of the signal applied to the frequency comparator 60. The network 90 controls the magnitude of the excitation current and thereby controls the power factor of the machine 50 whether it is operating as a motor or as a generator in parallel with other generators. An adjustment of the magnitude of the control signel $e_C$ or excitation current controls the output voltage of the machine 50 when it is operating alone as a generator. The network 91 controls the phase angle of the control voltage $e_C$ relative to the voltage of the transmission line 54 and thereby controls the output power of the machine 50 whether operating as a motor or a generator.

Several different types of circuits for providing counter E.M.F. and current feedback compensation are illustrated in the remaining figures. For simplicity the tachometer, source of control signals and frequency comparator of FIG. 9 are not shown in most of these figures and the exciters and commutators for each of the field windings 51 and 52 are illustrated as a single unit.

Figure 11:
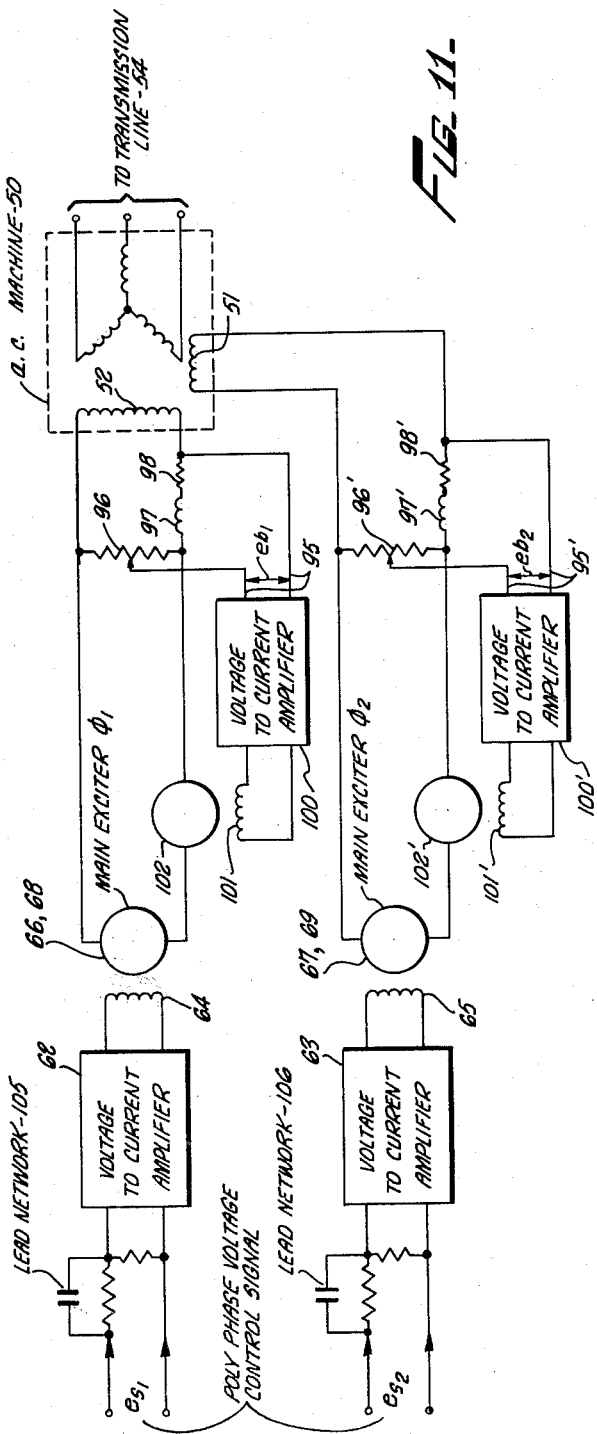
FIG. 11 is a block diagram of another embodiment of the present invention.

Referring now to FIG. 11 there is illustrated another type of feedback circuit for providing counter E.M.F. compensation. A pair of voltage sensing lines 95 are coupled between the output of the exciter, commutator 66, 68 and the field winding 52 of the machine 50 by means of a variable resistor 96 connected across the field winding 52 and an inductor 97 and a resistor 98 connected in series with the winding 52. The impedance values of the inductor 97 and the resistor 98 are chosen as a preselected portion of the values of the leakage reactance and resistance of the field winding 52 so that the voltage drop across the series connected inductor 97 and resistor 98 is proportional to the leakage and resistance voltage drops of the winding 52. The voltage across the inductor 97 and resistor 98 is subtracted from a preselected portion of the voltage applied to the winding 52 by means of the voltage divider resistor 97 and the resulting voltage $e_{b1}$ is directly proportional to the counter E.M.F. induced in the winding 52 by the rotating magnetic field. This feedback voltage $e_{b1}$ is amplified by a voltage-to-current amplifier 100 and applied to a field winding 101 of an auxiliary exciter 102 which is connected in series with the main exciter 66 and the field winding 52. The voltage produced by the exciter 102 is substantially equal to the counter E.M.F. generated in the winding 52 by the rotating magnetic field and thus provides the required voltage compensation.

The voltage compensation for the field winding 51 is identical to that just described and the similar components are marked by primed reference numerals. If desired a measure of the counter E.M.F. signal can be obtained from separate windings on the rotor wound in the same slots as the main field windings 51 and 52 and connected to separate slip rings.

The resistor 96, the resistor 97 and the inductor 98 of

FIG. 11 form a bridge circuit with the field winding 52. The resistor 96 forms two arms of the bridge and the series connected inductor 97 and resistor 98 form a third arm of the bridge. If it is desired to obtain a voltage feedback signal which includes voltages other than the counter E.M.F. other types of impedances may be employed in the bridge circuit. For example, frequency sensitive elements (capacitors etc.) may be utilized to form various arms of the bridge.

Current feedback is not utilized in the apparatus of FIG. 11 to modify the time constant of the field windings of the machine 50. Instead a pair of lead networks 105 and 106 are connected to the input of the amplifiers 62 and 63 for this purpose. Such lead networks which are well known in the art are sufficient to provide a relatively constant output voltage for the machine 50 for a moderate range of slip speeds.

It should be noted that the voltage feedback circuit of FIG. 11 obtains an exact measure of counter E.M.F. induced in the field windings of the machine 50 by the rotating magnetic field while the voltage feedback circuits of FIG. 9 obtain a measure of the counter E.M.F. voltage plus the leakage reactance and resistive drops in the field windings. For direct field terminal voltage feedback as illustrated in FIG. 9 the amplified voltage feedback signal supplies in addition to the generated rotor vector power, the leakage reactance and resistance losses as well. Otherwise the operation of the system of FIG. 9 is essentially the same as with only counter E.M.F. feedback as shown in FIG. 11.

The voltage measured by the feedback circuit may include other voltage components in addition to the counter E.M.F. as discussed above. By changing the voltage feedback sensing point so that the voltage feedback signal includes other components the system is caused to be self excited to the extent of supplying the resistance and reactance losses back to the voltage sensing point in addition to the counter E.M.F. power. Otherwise the operation is the same as if the voltage feedback included only the counter E.M.F. Generally the voltage feedback signal includes the counter E.M.F. as a major portion thereof regardless of the particular voltage sensing point utilized. Since the leakage reactance and resistive drops in the field windings of the machine 50 are relatively small compared to the induced counter E.M.F. at even low slip frequencies, the voltage measured across the input to the field windings or the output of the exciters provides a close measurement of the induced counter E.M.F.

Referring to FIG. 12 there is illustrated an equivalent circuit of a single phase of the field circuit of the machine 50 with the field windings thereof connected to the exciter 62 (also illustrated in equivalent circuit form). The other phase of the field circuit of the machine 50 is provided with the same feedback arrangement as is illustrated for the single phase. In the apparatus of FIG. 12 a measure of the voltage generated in the exciter is obtained by measuring the effective voltage generated by the exciter 66 behind the exciter armature impedance $Z_E$. This voltage may be obtained by employing a separate winding on the armature of the exciter 66 which is wound in the same slots as the main armature windings and coupling the separate winding to a separate commutator arrangement (not shown) in a well known manner. The induced generated voltage measured in the apparatus of FIG. 12 may also be obtained by employing a network similar to the shunt resistance 96 connected across the output of the commutator 68 and the series connected inductor 97 and resistor 98 of FIG. 10 wherein the values of the inductor 97 and resistor 98 are chosen as a predetermined portion of the leakage inductance and resistance of the armature windings of the exciter 66. The voltage drop across the series connected inductor and resistor is added to the voltage obtained across the shunt resistor to provide a true measure of the effective voltage $e_g$ generated behind the armature impedance of the exciter 66. This voltage is fed back through a magnitude adjustment network 107 to the input of the amplifier 62 to apply regenerative voltage feedback to the field winding for the respective phase of the machine 50 which cancels out or balances the counter E.M.F. induced by the rotating magnetic field and supplies the field leakage impedance drops and exciter impedance drops. The advantage of this form of compensation is that less control signal is required (that is the system is more sensitive) but normally requires a current feedback loop or the equivalent to stabilize the system against unstable self excitation.

Negative current feedback is obtained in the apparatus of FIG. 12 by measuring the current through the field windings with a current sensing element 80 and applying a measure of this current to the input of an auxiliary voltage amplifier 108 connected in series with the amplifier 62. If desired, a current feedback magnitude adjustment network may be connected in series with the current measuring element 80. The use of the two amplifiers 108 and 62 with the current and voltage feedback coupled to the inputs of separate amplifiers as shown in FIG. 12 permits convenient and independent adjustment of the voltage and current feedback loop gains.

Referring now to FIG. 13 there is illustrated a modification of the apparatus of FIG. 12 in which the exciter generated voltage $e_g$ is obtained by measuring the current through the field windings of the respective exciters. Since the exciters 66 and 67 are current-to-voltage amplifiers, the currents in the field windings thereof are representative of the output voltages of the exciters and include the counter E.M.F. voltages induced in the field windings of the main A.C. machine 50. A current sensing element 109 such as a shunt is coupled between the field winding of the exciter 66 and the input of the amplifier 62 through the network 107 to provide the desired positive voltage feedback. If the output of the amplifier 62 is in phase with the input thereof, the network 107 may include a phase inverter to change the phase of the feedback signal in a well known manner. While only one phase of the field circuit of the machine 50 is illustrated in FIG. 13 it is to be understood that the other phase of the field circuit is to be provided with the same feedback circuit arrangement. In this arrangement the change in gain of the exciters with speed does not affect the voltage feedback adjustment to obtain complete counter E.M.F. compensation.

In FIG. 14 there is illustrated another embodiment of an apparatus for providing positive voltage and negative current feedback from the field windings of an A.C. machine. In this embodiment the voltage and current feedback are combined to provide a composite feedback signal to the amplifiers 62 and 63. The voltage feedback signal is again obtained by measuring a portion of the voltage across the field winding 52 with a voltage divider 96A and subtracting a voltage representative of the leakage reactance and resistance drops of the field winding 52 with an inductor 97A and a resistor 98A connected in series with the field winding as shown. This arrangement provides an exact measurement of the induced counter E.M.F. in the field winding 52 as discussed in connection with FIG. 11. The voltage feedback signal from the winding 51 is obtained in the same manner and similar elements are marked by primed reference numerals.

Current feedback in the apparatus of FIG. 14 is obtained by means of resistors 110, 110′ connected in series with field windings 52 and 51 respectively. The counter E.M.F. and current feedback signals for each phase are summed across a pair of resistors 111 and 112 and 111′ and 112′ as shown. Adjustable taps 113 and 114 and 113′ and 114′ are coupled to the resistors 111, 112, and 111′, and 112′ for applying a combined counter E.M.F. and current feedback signal in series with the regulating signals $e_{s1}$ and $e_{s2}$ to the inputs of amplifiers 62 and 63.

A measure of the counter E.M.F. induced in the field windings of the machine 50 may also be obtained by measuring the voltage across the armature windings 53 as illustrated in FIG. 15. For this purpose a current transformer 120 is coupled to one phase (A) of the output of the armature windings 53 in parallel with a series inductor 121 and a series resistor 122. One end of the current transformer 120 and the resistor 122 are connected to the output line A as shown. The values of the resistor 122 and the inductor 121 are chosen to be proportional to the resistance and leakage inductance of one phase of the armature windings of the machine 50 so that the voltage drop across the resistor 122 and inductor 121 by the current flow through the transformer 120 is representative of the armature impedance voltage drop in one phase of the A.C. machine 50. This voltage drop across the inductor 121 and resistor 122 is added to the output voltage of the machine 50 and supplied to one phase of a three phase field winding 126 of a frequency changer 125. The voltage measuring networks connected to the other two phases (B and C) of the output of the machine 50 are identical to the network (120, 121 and 122) just described and are marked by primed and double primed reference characters. The voltages obtained from the output phases B and C of the machine 50 are applied to the two remaining phases of the three phase field winding 126 of the frequency changer 125. The frequency changer 125 is provided with a pair of armature windings 127 and 128 for providing a two phase output signal. The rotor of the frequency changer 125 may be coupled to the rotor of the machine 50 so that the frequency of the signals generated in the armature windings 127 and 128 is equal to the slip frequency or the frequency of the regulating signals $e_{s1}$ and $e_{s2}$. The armature windings 127 and 128 of the frequency changer 125 are coupled in series with the inputs to voltage amplifiers 62A and 63A, respectively. The frequency changer 125 and the voltage measuring networks coupled to output lines A, B and C of the machine 50 are arranged to provide positive voltage feedback signals to the inputs of amplifiers 62A and 63A of the proper magnitude to compensate for the counter E.M.F. induced in the field windings 151, 152 of the A.C. machine 50 by the rotating magnetic field.

Negative current feedback is obtained in the apparatus of FIG. 15 by a resistor 130 and an inductor 131 connected in series with the field winding 52. An adjustable resistor such as a potentiometer 132 is connected across the inductor 131 and an adjustable tap 133 of the potentiometer 132 is connected to one end of a magnitude adjusting potentiometer 135. The other end of the potentiometer 135 is connected between the output of the exciter 66 and the resistor 130 as shown so that the voltage applied across the potentiometer 135 is representative of the current through the field winding 52. The inductor 131 and the potentiometer 132 permit the phase of the current feedback signal to be changed over a small range for stability purposes. The potentiometer 135 is connected in series with the input to a voltage amplifier 137 as illustrated with an adjustable tap 136 of the potentiometer 135 being connected to the amplifier 137 to permit the magnitude of the negative current feedback to be readily adjusted.

A voltage divider network 140 is connected across the output of the exciter 66 for providing negative voltage feedback to extend or improve the frequency response characteristics of the exciter 66. This negative voltage feedback is obtained by connecting the input of the amplifier 62 in series with the voltage divider 140 as shown. Since the negative voltage feedback is effective in extending the frequency response range of the exciter 66, a voltage amplifier 62A may be utilized instead of the voltage-to-current amplifier 62 of FIG. 9. The current and negative voltage feedback circuits of FIG. 15 may be used without the counter E.M.F. compensation circuits for certain applications. The current and negative voltage feedback circuits for the field winding 51 of the machine 50 are the same as that just described and like components are designated by primed reference numerals.

The apparatus of the present invention can be utilized to compensate for the counter induced E.M.F. and changes in the field winding reactance of an A.C. machine having any desired number of phases in the field and armature circuits. It is necessary that the A.C. machine have polyphase field windings to produce a rotating magnetic field with A.C. excitation.

Figure 16:
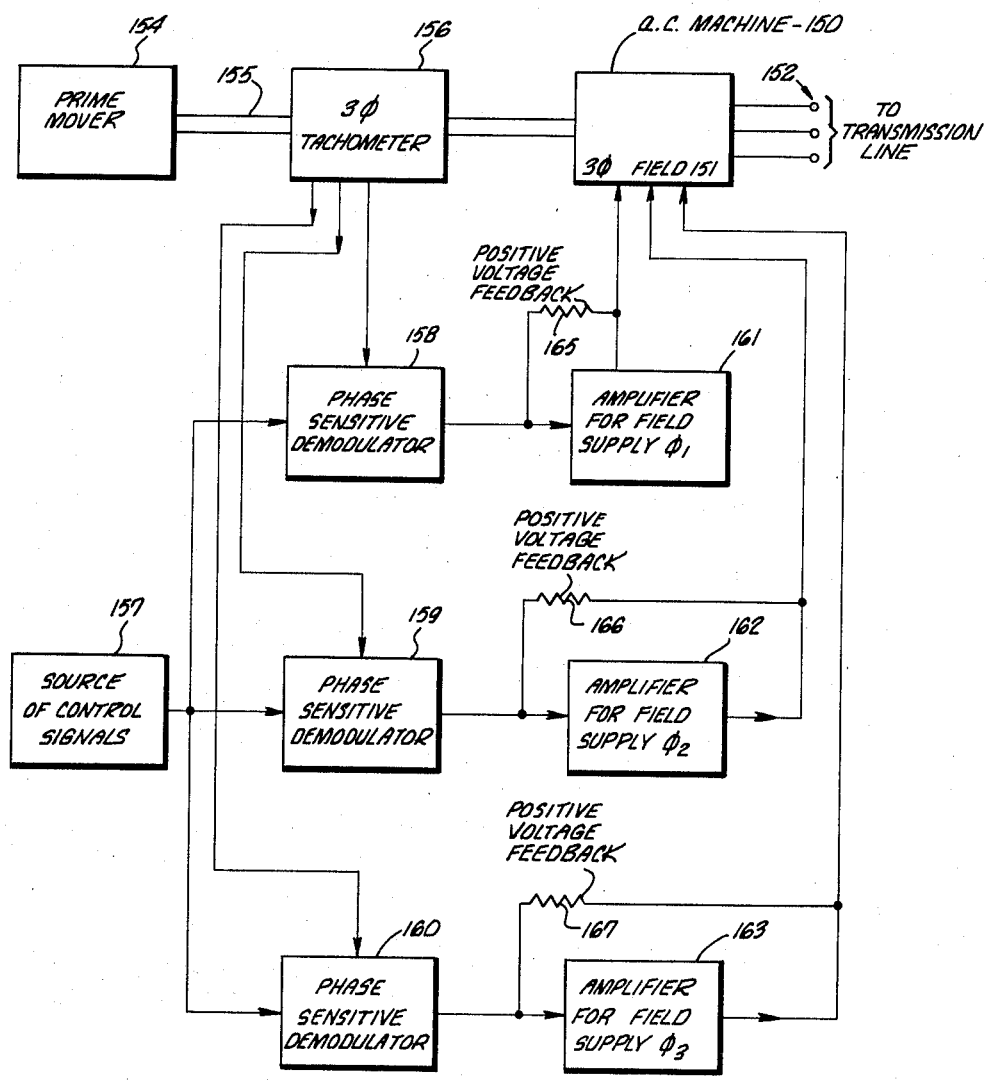
FIG. 16 is a block diagram of an apparatus of the present invention utilized with an A.C. machine having a three phase field.

In FIG. 16 there is illustrated an apparatus for compensating for the counter induced E.M.F. in a three phase field asynchronous machine 150. The machine 150 is illustrated with a three phase armature coupled to three output terminals 152. The machine 150 is coupled to a prime mover or load 154 by means of a shaft 155. A three phase tachometer 156 is coupled to the shaft 155 for producing a three phase output signal representative of the speed of the machine 150. A source of control signals 157 is provided for producing control signals of predetermined frequency, amplitude and phase. Three phase sensitive demodulators 158–160 are coupled between the tachometer 156 and the source of control signals 157 for producing three output signals having a frequency equal to the difference between frequencies of the output signals from the tachometer 56 and the source of the control signals 157. The output signals from the demodulators 158–160 are phase displaced 120° from each other. Power amplifiers 161–163 are connected between the demodulators 158–160 and separate phases of the field windings of the asynchronous machine 150 as shown for supplying three phase signals to the field windings which have a frequency equal to the frequency of the output signals from the demodulators. Positive voltage feedback resistors 165–167 are connected between the output and input of the amplifiers 161–163 as illustrated to provide a positive voltage feedback signal to the input of each of the amplifiers which includes the counter E.M.F. induced in the respective field windings 151 by the rotating magnetic field.

The apparatus described above for controlling the A.C. excitation of an asynchronous or A.C. machine provides a highly efficient and effective control of the output power and power factor of such a machine over a wide range of operating speeds. Various modifications of the apparatus will be readily apparent to those skilled in the art. It should be noted that the magnitude and phase of the regenerative or positive voltage feedback to compensate for the voltage induced in the field winding of the controlled A.C. machine by the rotating magnetic field may be varied slightly for particular applications. For example, the stability of the over all system may be improved in certain applications by feeding back a voltage that is a few degrees out of phase with the induced counter E.M.F. or that is phase and magnitude sensitive to frequency.

It should also be noted that the field windings of the controlled A.C. machine may be wound on the rotor or stator structure with armature windings on the other member. The exciters may be mounted on the same shaft with the machine 20 as is shown in FIG. 1 and described above or on a separate shaft driven by a separate prime mover. Also a device other than a tachometer may be used for measuring the shaft speed if desired. For example, synchro transformers or frequency changers may be employed to measure the shaft speed.

What is claimed is:

1. In an apparatus for controlling the excitation to an alternating current dynamoelectric machine having a polyphase field winding and an armature, the combination which comprises a source of control signals, control means responsive to the relative speed of rotation of the armature and field windings of the machine and coupled between the source of control signals and the field windings of the machine for applying polyphase voltages of slip frequency to the field windings to produce a rotating magnetic field for the armature, measuring means for obtaining voltage feedback signals which include a measure of the counter E.M.F. induced in each phase of the field windings by the rotating magnetic field and means coupled between the measuring means and the control means for combining the voltage feedback signals with the control signals to provide positive voltage feedback to substantially cancel out the counter E.M.F. induced in each phase of the field windings by the rotating magnetic field, whereby the real and reactive power output of the machine may be controlled by the control signals.

2. The combination as defined in claim 1 wherein the measuring means includes a pair of voltage sensing lines coupled across each phase of the field windings of the dynamoelectric machine.

3. In an apparatus for controlling an alternating current machine having polyphase field windings and an armature, the combination which comprises a source of control signals, control means coupled to the source of control signals for applying alternating current voltages to each phase of the field windings to control the field excitation and to produce a rotating magnetic field, measuring means for obtaining a feedback signal for each phase of the field windings which includes a measure of the voltage induced in the respective phase of the field windings by the rotating magnetic field and feedback means for applying a voltage to each phase of the field windings which is substantially proportional to and substantially in phase with said feedback signal associated with the respective phase of the field windings to compensate for the voltages induced in the field windings by the rotating magnetic field.

4. The combination as defined in claim 3 wherein the measuring means is connected to the field windings of the alternating current machine.

5. The combination as defined in claim 3 wherein the measuring means is connected to the armature of the alternating current machine.

6. The combination as defined in claim 3 wherein the control means includes at least one exciter and wherein the measuring means is connected to the exciter.

7. The combination as defined in claim 3 wherein the field windings of the alternating current machine include a main polyphase field winding and an auxiliary polyphase field winding, wherein the control means is coupled to the main field winding and wherein the feedback means is coupled to the auxiliary field winding.

8. The combination as defined in claim 7 including means for modifying the effective time constant of the main field winding to maintain a substantially linear relationship between the amplitude of the control signals and the magnitude of the current flow in the main field winding over a predetermined range of frequencies of the main field current.

9. In an apparatus for controlling an alternating current machine having polyphase field windings and an armature, the combination which comprises a source of control signals, means for obtaining a speed reference signal representative of the speed of the machine, means including frequency comparator means coupled between the source of control signals and the speed reference signal generating means for providing a polyphase output signal which is representative of the difference in the frequencies of the control signals and the speed reference signal, amplifying means coupled between each phase of the field windings and the output of the frequency comparator means for applying polyphase alternating current voltages having the frequency of the output signal from the frequency comparator means to the field windings to produce a rotating magnetic field, measuring means for obtaining a voltage feedback signal associated with each phase of the field windings which includes a measure of the counter E.M.F. induced in the respective phase of the field winding by the rotating magnetic field and means for applying a voltage to each phase of the field windings which is proportional to the voltage feedback signal associated with the respective phase of the field windings to compensate for the counter E.M.F. induced in the field windings by the rotating magnetic field.

10. The combination defined in claim 9 wherein the last named means comprises signal attenuating means coupled between each phase of the field windings and the input to the respective amplifying means, the signal attenuating means having a transfer function which is substantially the reciprocal of the transfer function of the amplifying means.

11. The combination defined in claim 10 including a negative current feedback means coupled between each phase of the field windings and the input of the respective amplifying means for compensating for the field winding reactance of the alternating current machine.

12. In an apparatus for controlling an alternating current machine having an armature and a plurality of field windings for producing a rotating magnetic field for the armature the combination which comprises a source of control signals, control means responsive to the relative speed of rotation between the armature and the field windings and coupled between the source of control signals and the field windings for applying signals to the field windings to control the direction and speed of rotation of the magnetic field produced by the field windings in accordance with the frequency of the control signals, means for obtaining a voltage feedback signal associated with each phase of the field windings which includes a measure of the voltage induced across the respective phase of the field windings by the rotating magnetic field and means including the control means for applying a voltage to each phase of the field windings which is proportional to and substantially in phase with said voltage feedback signal obtained across the respective phase of the field windings to substantially cancel out the voltages induced in the field windings by the rotating magnetic field.

13. The combination as defined in claim 12 including means for obtaining a measure of the current flow through each phase of the field windings and means including the control means for supplying a current to each phase of the field windings which is proportional to and out of phase with said measure of the current obtained through the respective phase of the field windings to provide negative current feedback to modify the effective time constant of the field windings.

14. In an apparatus for controlling the magnitude and phase of the field current in a non-salient pole dynamoelectric machine having a polyphase armature and at least two field windings for producing a polyphase magnetic field for the armature the combination which comprises a source of alternating current control signals, speed sensitive means coupled to the dynamoelectric machine and responsive to the speed of rotation of the armature relative to the field windings, means including at least one polyphase phase sensitive demodulator coupled to the source of control signals, the speed sensitive means and to the field windings to apply signals to each of the field windings which have a frequency that is proportional to the difference between the frequency of the control signals and the speed of the armature relative to the field windings to control the direction and speed of rotation of the magnetic field produced by the field windings, means coupled to each of the field windings for providing a measure of the voltage induced across each of the field windings by the rotating magnetic field, and means under the control of the last named means for applying a voltage to each of the field windings which substantially cancels out the voltage induced in the respective field winding by the rotating magnetic field.

15. In an apparatus for controlling an alternating current non-salient pole machine having polyphase field windings, an armature and a rotatable shaft coupled to the armature or the field windings for providing rotary motion therebetween, the combination which comprises a source of alternating current control signals, polyphase speed measuring means coupled to the machine for producing polyphase speed reference signals having a frequency representative of the speed of the machine, frequency comparator means coupled between the speed measuring means and the source of control signals for providing polyphase output signals representative of the difference between the frequencies of the reference signals and the control signals, means including at least one exciter mounted on the shaft and coupled between the output of the frequency comparator and the field windings of the alternating current machine for applying alternating currents to the field windings to produce a rotating magnetic field relative to the field windings, means coupled between the field windings and the exciting means for applying a regenerative voltage to each phase of the field windings to compensate for the voltage induced in the field windings by the rotating magnetic field and means coupled to the field windings of the alternating current machine for modifying the effective time constant thereof to maintain a substantially linear relationship between the amplitude of the control signals and the magnitude of the field current in the alternating current machine with changes in the frequency of the field current.

16. In an apparatus for controlling the magnitude and phase of the excitation of a non-salient pole dynamoelectric machine having an armature and at least two field windings for producing a polyphase magnetic field for the armature the combination which comprises a source of alternating current control signals, speed measuring means coupled to the dynamoelectric machine for producing a speed reference signal representative of the speed of rotation of the armature relative to the field windings thereof, polyphase frequency comparator means having a first input coupled to the speed measuring means and a second input coupled to the source of control signals for producing a polyphase output signal having a frequency which is equal to the difference in the frequencies of the reference and control signals, polyphase exciting means coupled to the dynamoelectric machine for rotation therewith, polyphase demodulator means coupled between the exciting means and the field windings of the dynamoelectric machine for demodulating the signals generated in the exciting means, amplifying means coupled between the output of the frequency comparator means and the exciting means whereby the excitation signals applied to the field windings of the dynamoelectric machine have a frequency equal to the frequency of the output signals from the frequency comparator means, measuring means coupled to the dynamoelectric machine for providing a measure of the voltage induced across each of the field windings by the rotating magnetic field and means for applying a voltage to the amplifying means which is proportional to and substantially in phase with said measure of the voltage induced across each of the field windings to provide regenerative voltage feedback to compensate for the voltages induced in the field windings by the rotating magnetic field.

17. The combination as defined in claim 16 wherein said measuring means is coupled to each of the field windings of the dynamoelectric machine.

18. The combination as defined in claim 16 wherein said measuring means is coupled to the armature of the dynamoelectric machine.

19. The combination as defined in claim 16 wherein said measuring means is coupled to the exciting means.

20. In an apparatus for controlling an alternating current machine having polyphase field windings and an armature the combination which comprises a source of alternating current control signals, a polyphase speed measuring means coupled to the machine for producing reference signals having a frequency representative of the speed of the machine, frequency comparator means coupled between the speed measuring means and the source of control signals for providing polyphase output signals representative of the difference between the frequencies of the reference signals and the control signals, a single phase exciter associated with each phase of the field windings of the alternating current machine and including an armature winding and a field winding, amplifying means coupled between the field windings of the exciters and the output of the frequency comparator means, phase sensitive demodulating means connected individually between the armatures of each of the exciters and the respective phases of the field windings of the alternating current machine, means for producing rotary motion between the armature and field windings of each of the exciters, means coupled individually to each phase of the field windings of the alternating current machine for obtaining a voltage feedback signal which includes as a major portion thereof a measure of the voltage induced across the respective phases of the field windings of the alternating current machine by the rotating magnetic field and means for applying a voltage to the field windings of the respective phases of the alternating current machine which is proportional to the respective voltage feedback signal phase to compensate for the voltages induced in the field windings of the alternating current machine by the rotating magnetic field.

21. The combination as defined in claim 20 wherein the last named means includes an auxiliary exciter coupled to each phase of the field windings of the alternating current machine and means for supplying excitation current to each of the auxiliary exciters which is proportional to and substantially in phase with the voltage feedback signal obtained across the respective phase of the field windings of the alternating current machine.

22. The combination as defined in claim 20 wherein the means for obtaining the voltage feedback signal includes a voltage divider connected across the respective phases of the field windings of the alternating current machine and an inductance and a resistance connected in series with the respective phase of the field windings of the alternating current machine.

23. The combination as defined in claim 20 including means for obtaining a measure of the current flow through each phase of the field windings of the alternating current machine and means for supplying a current signal to the respective phase of the field windings of the alternating current machine which is proportional to and out of phase with said measure of the current obtained through the respective phase of the field windings to modify the effective time constant in the field windings of the alternating current machine and thereby maintain a substantially linear relationship between the amplitude of the control signals and the magnitude of the field current in the alternating current machine over a predetermined range of frequencies of field current.

24. The combination as defined in claim 20 including means for controlling the amplitude and phase angle of the control signals relative to the voltage in the armature of the alternating current machine.

25. In an apparatus for controlling an alternating current machine having polyphase field windings and an armature, the combination which comprises a source of control signals, means responsive to the control signals and to the speed of the alternating current machine for applying alternating current to each phase of the field windings to control the excitation of the field windings and to produce a rotating magnetic field, means for obtaining a voltage feedback signal associated with each phase of the field windings which includes a measure of the voltage induced in the respective phase of the field windings by the rotating magnetic field, means responsive to the voltage feedback signal for applying a voltage to each phase of the field windings which is proportional to the voltage feedback signal associated with the respective phase of the field windings to provide positive voltage feedback to compensate for the voltages induced in the field windings by the rotating magnetic field, means for obtaining a measure of the current flow through each phase of the field windings and means for supplying current to each phase of the field windings which is proportional to and substantially out of phase with said measure of the current obtained in the respective phase of the field windings to provide negative current feedback to compensate for changes in the impedance of the field windings with changes in the frequency of said alternating currents.

26. In an apparatus for controlling an alternating current dynamoelectric machine having polyphase field windings and an armature, the combination which comprises a source of control signals, means responsive to the relative speed of rotation between the armature and field windings of the dynamoelectric machine and coupled to the source of control signals for producing a regulating signal for each phase of the field windings having at least one frequency component thereof which is representative of the slip frequency of the dynamoelectric machine, amplifying means coupled between the last named means and the field windings of the dynamoelectric machine for applying polyphase alternating current voltages of slip frequency to the field windings, measuring means for obtaining a voltage feedback signal associated with each phase of the field windings which includes a measure of the counter E.M.F. induced in the respective phase of the field windings by the rotating magnetic field, means for obtaining a measure of the current flow through each phase of the field windings, and means for combining the measure of the current, the voltage feedback signal and the regulating signal associated with each phase of the field windings to provide negative current feedback to compensate for the field winding reactance and to provide positive voltage feedback to compensate for the counter E.M.F. induced in the field windings by the rotating magnetic field whereby the real and reactive power output of the dynamoelectric machine may be controlled by the phase and amplitude of the regulating signal.

27. In an apparatus for controlling an alternating current machine having polyphase field windings, an armature and a rotatable shaft coupled to the armature or the field windings for providing rotary motion therebetween, the combination which comprises a source of alternating current control signals, control means coupled to the source of control signals and responsive to the speed of the alternating current machine for providing polyphase regulating signals having a frequency equal to the slip frequency of the alternating current machine, polyphase exciting means coupled between the control means and the field windings of the alternating current machine for applying alternating current voltages to the field windings to produce a rotating magnetic field, means for obtaining a measure of the current flow through each phase of the field windings of the alternating current machine, summing means for obtaining a difference signal representative of the difference between the regulating signal and said measure of the current for the respective phases of the field windings and means including amplifying means connected between the summing means and the polyphase exciting means for extending the frequency response characteristics of the system to maintain the amplitude of the current in the field windings of the dynamoelectric machine substantially proportional to the amplitude of the regulating signal for the respective phase of the field windings over a large range of slip frequencies.

28. The combination as defined in claim 27 wherein the last named means comprises a voltage-to-current amplifier for each phase of the field windings.

29. The combination as defined in claim 27 wherein the last named means includes means for feeding signals representative of the voltage produced by each phase of the exciting means back to the summing means substantially out of phase with the difference signal for the respective phases.

30. In an apparatus for controlling an alternating current machine having polyphase field windings and an armature the combination which comprises a source of alternating current control signals, speed measuring means coupled to the machine for producing reference signals having a frequency representative of the speed of the machine, frequency comparator means coupled between the speed measuring means and the source of control signals for providing polyphase output signals representative of the difference between the frequencies of the reference signals and the control signals, a single phase exciter associated with each phase of the field windings of the alternating current machine and including an armature winding and a field winding, a voltage-to-current amplifier coupled between the field windings of each of the exciters and the output of the frequency comparator means, phase sensitive demodulating means connected individually between the armatures of each of the exciters and the respective phases of the field windings of the alternating current machine, means for producing rotary motion between the armature and field windings of each of the exciters, means for obtaining a measure of the current flow through each phase of the field windings of the alternating current machine and means responsive to said measure of the current flow through the respective phases of the field windings of the alternating current machine for applying negative current feedback to the respective voltage-to-current amplifier to modify the effective time constant of the field windings of the alternating current machine and thereby maintain a substantially linear relationship between the amplitude of the control signals and the magnitude of the field current in the alternating current machine over a predetermined range of frequencies of field current.

No references cited.